United States Patent
Sanjuan et al.

(10) Patent No.: US 10,797,552 B2
(45) Date of Patent: Oct. 6, 2020

(54) TOOL SYSTEM FOR TIGHTENING RETIGHTENABLE WEDGE SYSTEM IN SLOT OF GENERATOR STATOR CORE

(71) Applicant: Siemens Energy, Inc., Orlando, FL (US)

(72) Inventors: Xabier A. Sanjuan, Orlando, FL (US); Michael R. Vindler, Pittsburgh, PA (US); Michael A. Hall, Greensburg, PA (US); Timothy J. Garner, Winter Springs, FL (US); James A. Bauer, Gibsonia, PA (US); Charles C. Moore, Hibbs, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 324 days.

(21) Appl. No.: 15/831,985

(22) Filed: Dec. 5, 2017

(65) Prior Publication Data
US 2019/0173347 A1 Jun. 6, 2019

(51) Int. Cl.
*H02K 3/487* (2006.01)
*H02K 15/02* (2006.01)
*H02K 15/00* (2006.01)
*B25B 27/02* (2006.01)

(52) U.S. Cl.
CPC ........... *H02K 3/487* (2013.01); *H02K 15/024* (2013.01); *B25B 27/023* (2013.01); *H02K 15/0018* (2013.01)

(58) Field of Classification Search
CPC .. H02K 3/487; H02K 15/024; H02K 15/0018; B25B 27/023
See application file for complete search history.

(56) References Cited

U.S. PATENT DOCUMENTS

| | | | |
|---|---|---|---|
| 5,341,095 A * | 8/1994 | Shelton | G01R 31/34 324/545 |
| 7,707,710 B2 * | 5/2010 | Lape | B25B 27/023 173/117 |
| 7,866,421 B2 * | 1/2011 | Moore | H02K 15/0018 180/164 |

(Continued)

FOREIGN PATENT DOCUMENTS

| | | | | |
|---|---|---|---|---|
| EP | 2096738 A1 | 9/2009 | | |
| EP | 2894769 A1 * | 7/2015 | | H02K 3/487 |

(Continued)

OTHER PUBLICATIONS

PCT International Search Report and Written Opinion dated Jul. 19, 2019 corresponding to PCT Application No. PCT/US2018/061753 filed Nov. 19, 2018.

*Primary Examiner* — Peter Dungba Vo
*Assistant Examiner* — Jeffrey T Carley

(57) ABSTRACT

A tool system for tightening a retrightenable wedge system in a slot of a generator stator core is presented. The tool system includes a carriage assembly and a wedge tool assembly that is pivotally coupled to the carriage assembly. The carriage assembly includes motorized drives that axially moves the tool system along the slot and holds the tool system on the slot at an axial position. The wedge tool assembly includes a torqueing socket to tighten the retightenable wedge assembly in the slot. The torqueing socket is driven by a worm gear arrangement.

20 Claims, 4 Drawing Sheets

(56) References Cited

U.S. PATENT DOCUMENTS

| | | | |
|---|---|---|---|
| 2002/0050063 A1* | 5/2002 | Iversen | B25B 27/023 29/889.22 |
| 2002/0104693 A1 | 8/2002 | Moore et al. | |
| 2002/0112345 A1* | 8/2002 | Pezzano | B25B 27/023 29/732 |
| 2004/0000923 A1 | 1/2004 | Fischer et al. | |
| 2004/0020002 A1 | 2/2004 | Moore et al. | |
| 2004/0100270 A1 | 5/2004 | Fischer et al. | |
| 2005/0005700 A1 | 1/2005 | Abbasi et al. | |
| 2006/0026818 A1* | 2/2006 | Stewart | H02K 15/0018 29/596 |
| 2008/0098832 A1 | 5/2008 | Abbasi et al. | |
| 2009/0031556 A1* | 2/2009 | Lape | B25B 27/023 29/732 |
| 2009/0031557 A1* | 2/2009 | Lape | B25B 27/023 29/732 |
| 2013/0234752 A1 | 9/2013 | Jaszcar et al. | |
| 2013/0298366 A1* | 11/2013 | Vitello | H02K 15/024 29/402.08 |
| 2018/0287448 A1* | 10/2018 | Sanjuan | H02K 3/487 |

FOREIGN PATENT DOCUMENTS

| | | | | |
|---|---|---|---|---|
| EP | 2894769 A1 | 7/2015 | | |
| EP | 2096738 B1 * | 5/2016 | | H02K 15/0018 |
| WO | 2016081702 A1 | 5/2016 | | |

* cited by examiner

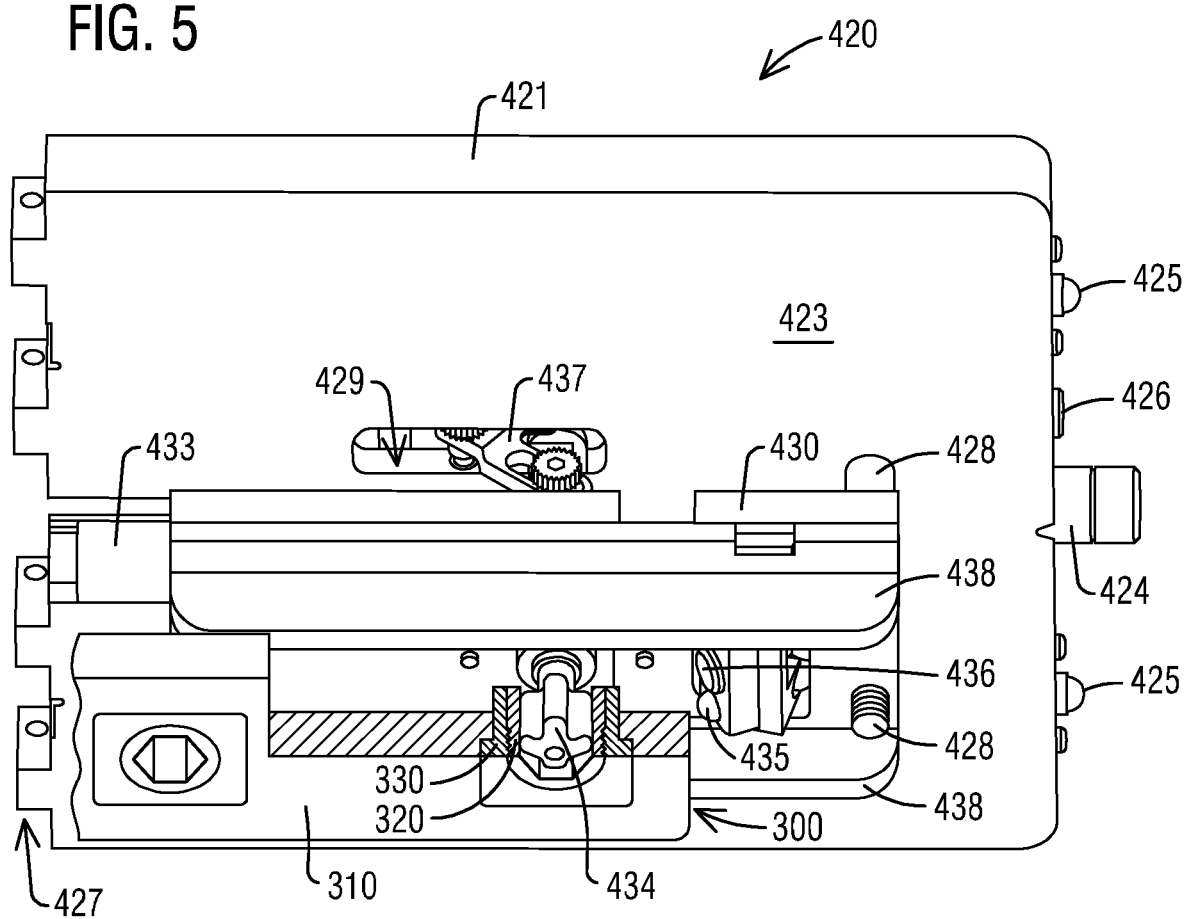

US 10,797,552 B2

TOOL SYSTEM FOR TIGHTENING RETIGHTENABLE WEDGE SYSTEM IN SLOT OF GENERATOR STATOR CORE

TECHNICAL FIELD

The present invention relates generally to a tool system for tightening a retrightenable wedge system in a slot of a generator stator core.

DESCRIPTION OF RELATED ART

A generator is a component in power generation industry that converts mechanical power to electrical power. A generator typically includes a stator and a rotor. A generator stator may employ a stator core comprised a plurality of axially extending slots along an internal circumference of the core. At least one coil is placed within each of the stator slots. During generator operation, the coil in the slot may tend to move within the slot. Such movement of the coil within the slot may damage the generator stator. A wedge system may be placed on the coil to prevent movement of the coil within the slot.

The wedge system may become loose over time in generator operation, which may decrease life of the stator due to wear caused by excessive vibration. Periodic tightness inspection of the wedge system may be required either during maintenance or at power plant outages. A full or partial re-wedging may be recommended after tightness inspection. The full or partial re-wedge may require removal of the generator rotor and is a time and material consumptive process, which may be costly to perform.

SUMMARY OF INVENTION

Briefly described, aspects of the present invention relate to a tool system for tightening a retrightenable wedge system in a slot of a generator stator core.

According to an aspect, a tool system for tightening a retightenable wedge system in a slot of a generator stator core is presented. The retightenable wedge comprises a first filler layer placed on a coil, a spring member placed on the first filler layer, a second filler layer placed on the spring member, and a retightenable wedge assembly comprising a tightening member and a slot wedge placed on the second filler layer. The tool system comprises a tool carriage assembly configured to axially moving the tool system along the slot and to hold the tool system on the slot at an axial position. The tool system comprises a wedge tool assembly pivotally coupled to the tool carriage assembly configured to tighten the retightenable wedge assembly. The wedge tool assembly comprises a housing and a torqueing socket arranged on the housing. The torqueing socket is configured to be inserted into the tightening member to tighten the retightenable wedge assembly.

According to an aspect, a method for tightening a retightenable wedge system in a slot of a generator stator core using a tool system is presented. The retightenable wedge comprises a first filler layer placed on a coil, a spring member placed on the first filler layer, a second filler layer placed on the spring member, and a retightenable wedge assembly comprising a tightening member and a slot wedge placed on the second filler layer. The tool system comprises a tool carriage assembly and a wedge tool assembly pivotally coupled to the tool carriage assembly. The method comprises axially moving the tool system along the slot by the tool carriage assembly. The method comprises holding the tool system on the slot at an axial position by the tool carriage assembly. The method comprises tightening the retightenable wedge assembly by the wedge tool assembly. The wedge tool assembly comprises a housing and a torqueing socket arranged on the housing. The torqueing socket is configured to be inserted into the tightening member to tighten the retightenable wedge assembly.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings:

FIG. 5 illustrates a schematic perspective view of a wedge tool assembly having guiding skids for tightening a retightenable wedge system according to an embodiment of the invention.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
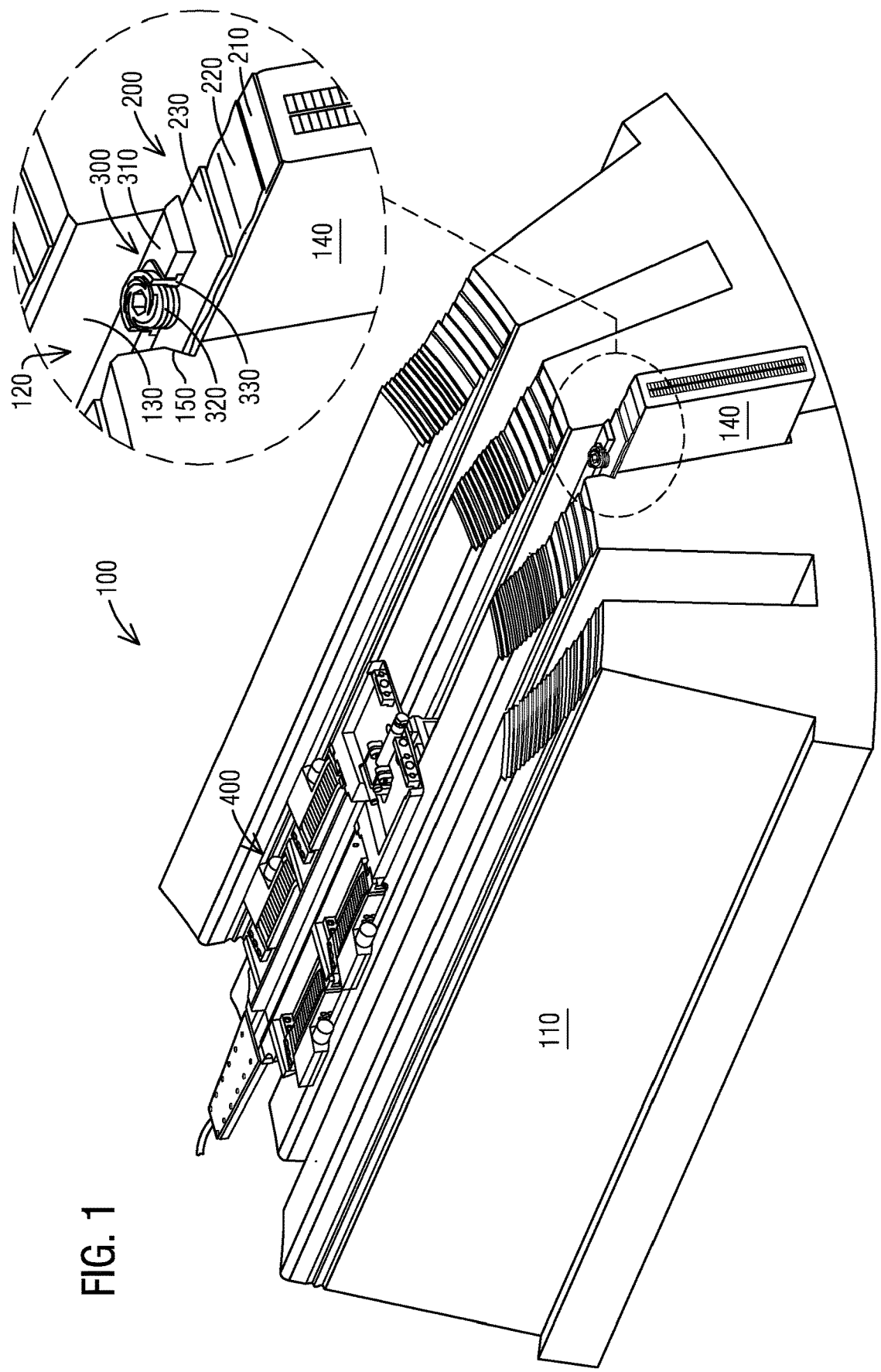
FIG. 1 illustrates a schematic perspective view of a generator stator and a tool system for tightening a retightenable wedge system according to an embodiment of the invention.

FIG. 1 illustrates a schematic perspective view of a generator stator 100 and a tool system 400 for tightening a retightenable wedge system 200 according to an embodiment. The generator stator 100 may include a stator core 110. The stator core 110 includes a plurality of slots 120 that may axially extend along a longitudinal direction of the generator stator core 110. A plurality of coils 140 may be placed within the slots 120. A plurality of retightenable wedge systems 200 may be placed on the coils 140 engaged with wedge grooves 150 on side walls 130 of the slots 120.

An enlarged and cut away view of the retightenable wedge system 200 in the slot 120 is illustrated in FIG. 1. A retightenable wedge system 200 may include a first filler layer 210 placed on the coil 140. The first filler layer 210 may prevent radial movement of the coil 140 within the slot 120. A spring member 220 may be placed on the first filler layer 210. The spring member 220 may apply a continuous radial load onto the coil 140. The spring member 220 may be referred to as a ripple spring or a pre-stressed driving strip (PSDS). A second filler layer 230 may be placed on the spring member 220. The second filler layer 230 may consist of a similar material of the first filler layer 210. A retightenable wedge assembly 300 may be placed on the second filler layer 230. The retightenable wedge assembly 300 may include a slot wedge 310 engaged with the wedge grooves 150 on side walls of the slots 120. The slot wedge 310 may maintain the second filler layer 230, the spring member 220, the first filler layer 210 and the coil 140 within the slot 120 in a radial direction. The slot wedge 310 may be made of nonmetallic and nonmagnetic composite material, such as polymer reinforced with fiberglass.

The slot wedge 310 may become loose in the wedge grooves 150 over time in generator operation, which may imply a loss of radial loading on the coil 140. The coil 140 may move within the slot 120 if a radial loading on the coil 140 is below a required value. The movement of the coil 140 within the slot 120 may cause damage of the generator stator 100.

The retightenable wedge assembly 300 may include a plurality of tightening members 320. The tightening members 320 may be tightenable to establish a radial position below the slot wedge 310, by which a radial load may be imparted onto the second filler layer 230. The second filler layer 230 may evenly distribute the radial load onto the spring member 220. The spring member 220 may apply the evenly distributed radial load onto the coil 140 to prevent movement of the coil 140 within the slot 120. Tightness of the wedge system 200 may be reestablished. The retightenable wedge assembly 300 may include a plurality of locking members 330. The locking members 330 may lock the tightening member 320 in place for restraining the tightening members 320 from backing out of the slot wedge 310. Size, number, and spacing of the tightening members 320 may be determined depending on amount of the radial load required for tightening the wedge system 200.

FIG. 1 illustrates a tool system 400 for tightening the retightenable wedge system 200. The tool system 400 may be placed on top surfaces of the side walls 130 of the slot 120. The tool system 400 may be movable along the slot 120. The tool system 400 may be securely held on the slot 120 at an axial position when retightening one of the tightening members 320. The tool system 400 may move to another axial position for retightening another tightening member 320. The tool system 400 may be securely held on the slot 120 at an axial position by, for example, a magnetic force.

Figure 2:
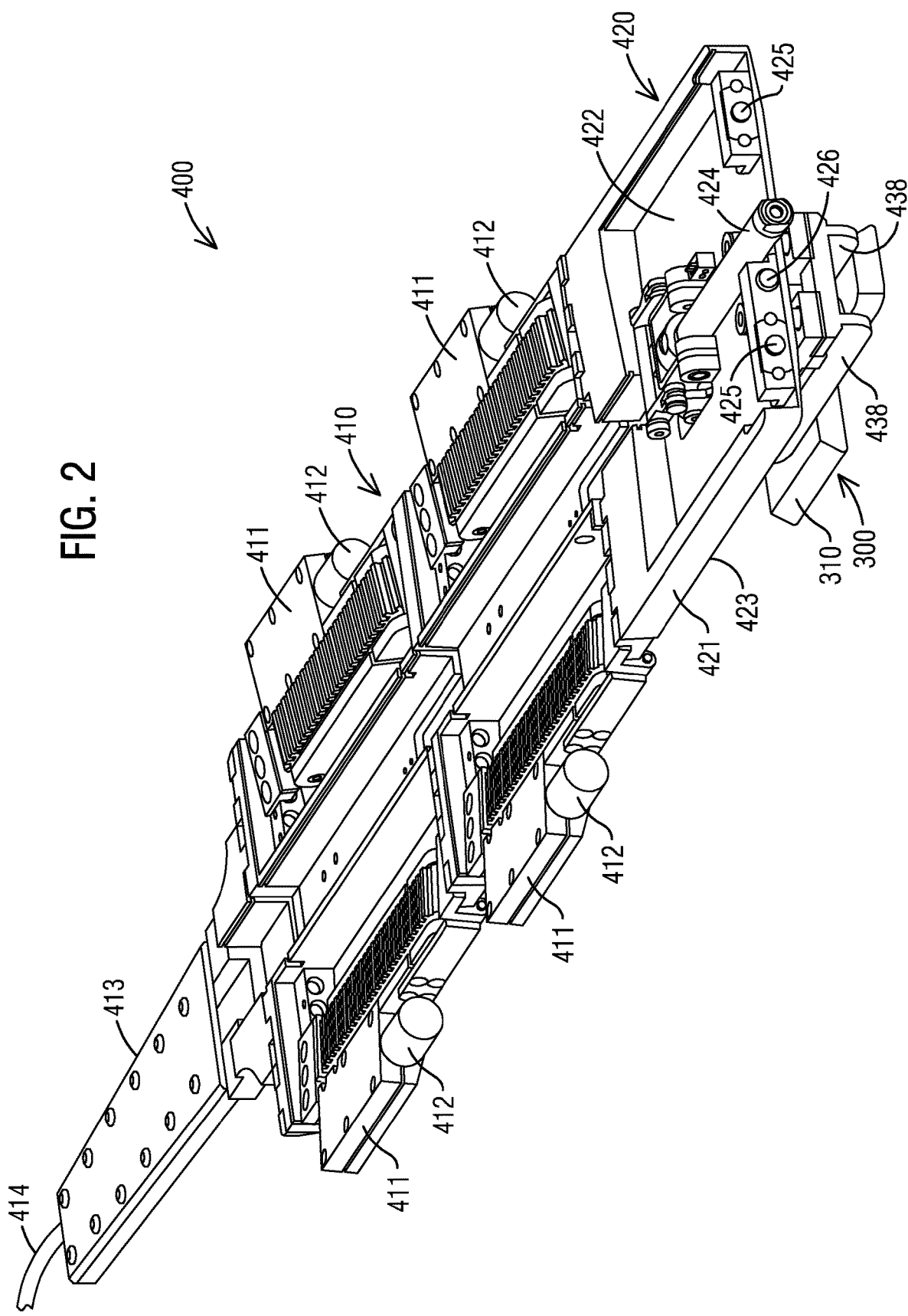
FIG. 2 illustrates a schematic perspective view of a tool system for tightening a retightenable wedge system according to an embodiment of the invention.

FIG. 2 illustrates a schematic perspective view of a tool system 400 according to an embodiment. The tool system 400 may include a tool carriage assembly 410. The tool carriage assembly 410 may include at least a pair of motorized drives 411. The motorized drives 411 may drive the wedge tool assembly 420 at a desired selective axial position for tightening a tightening member 320. The carriage assembly 410 may have permanent magnets embedded at the bottom surface which allows the carriage assembly 410 to be attracted on the stator core 110 and to be held at a desired selective axial position. The motorized drives 411 may include a digital encoder 412 which may send out a digital signal of the axial position of the tool system 400. The tool system 400 may include an arm 413 that is pivotally coupled to one end of the tool carriage assembly 410. A bundle of cables 414 may be connected to the arm 413. The bundle of cables 414 may include, for example, a power supply cable for providing power to the tool system 400, a signal transmission cable for transmitting signals from the tool system 400 to a control device, such as a computer.

The tool system 400 may include a wedge tool assembly 420. The wedge tool assembly 420 may be pivotally coupled to the other end of the carriage assembly 410 that is opposite to the arm 413. The wedge tool assembly 420 may include a housing 421 having a top surface 422 and a bottom surface 423. The top surface 422 may have a concave shape. A shaft 424 may be embedded in the concave shaped top surface 422. The concave shaped top surface 422 and the embedded shaft 424 may provide a compact arrangement that may allow the tool system 400 to tighten the retightenable wedge system 200 without removing a rotor.

At least one light source 425 may be attached at a front side surface of the housing 421. A camera 426 may also be attached at the front side surface of the housing 421. The camera 426 may be a digital camera. The camera 426 may provide digital signal of the stator core 110.

Figure 3:
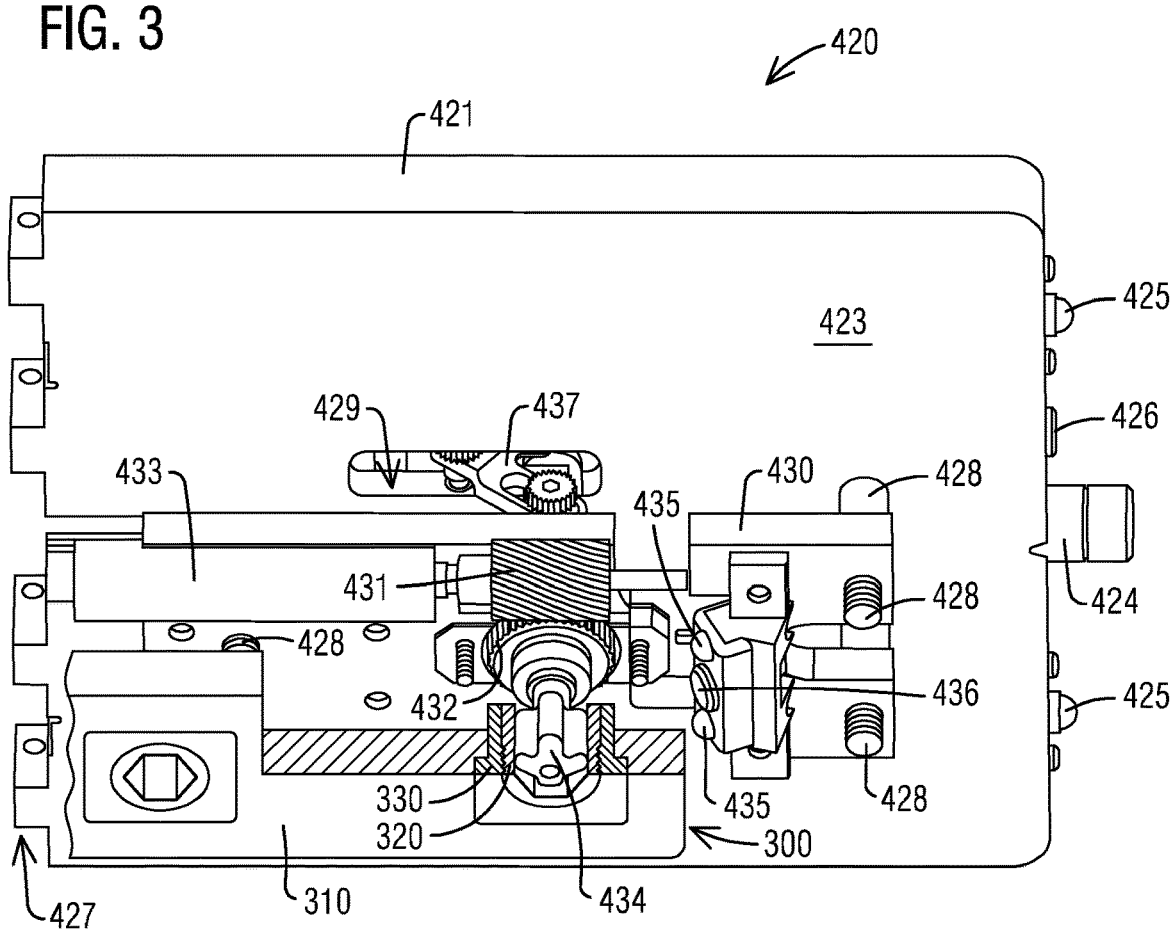
FIG. 3 illustrates a schematic perspective view of a wedge tool assembly for tightening a retightenable wedge system according to an embodiment of the invention.
Figure 4:
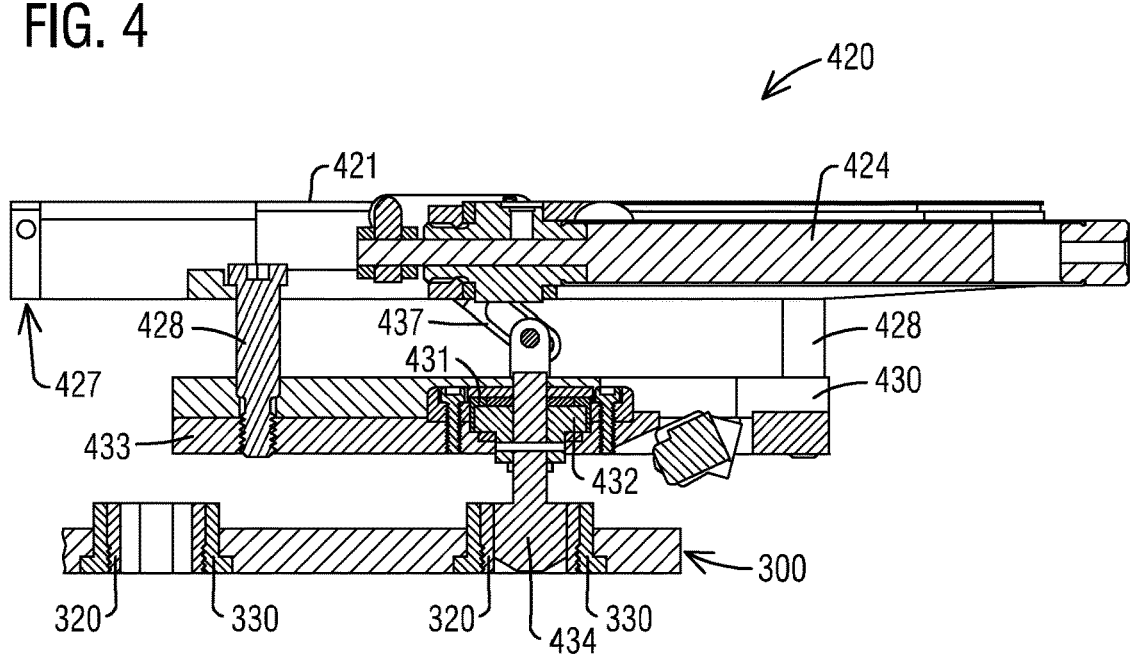
FIG. 4 illustrates a schematic cross section side view of the wedge tool assembly as shown in FIG. 3.

FIG. 3 illustrates a schematic perspective view of a wedge tool assembly 420 according to an embodiment. FIG. 4 illustrates a schematic cross section side view of the wedge tool assembly 420 as shown in FIG. 3. According to the exemplary embodiment illustrated in FIGS. 3 and 4, the wedge tool assembly 420 may include a hinge assembly 427 arranged at the aft side surface of the housing 421. The wedge tool assembly 420 may be pivotally coupled to the carriage assembly 410 by the hinge assembly 427.

The wedge tool assembly 420 may include a plate 430 attached to the bottom surface 423 of the housing 421 by a plurality of screws 428 A radial position of the plate 430 is adjustable by the screws 428. The wedge tool assembly 420 may include a worm gear arrangement attached to the plate 430. The worm gear arrangement may include a worm shaft 431 and a worm wheel 432. The worm shaft 431 may be driven by a motor 433. A torqueing socket 434 may be arranged within the worm wheel 432. The torqueing socket 434 may be engaged into the tightening member 320 of the retightenable wedge assembly 300 to tighten the tightening member 320 until a required radial load is applied on the coil 140.

The torqueing socket 434 may be connected to a hinge 437. The hinge 437 may be connect to the shaft 424 through an aperture 429 perforating the housing 421 from the bottom surface 423 to the top surface 422. The shaft 424 may adjust a radial position of the torqueing socket 434 via the hinge 437. For example, the shaft 424 may be torqued to move the torqueing socket 434 out of the tightening member 320 via the hinge 437 once the retightenable wedge assembly 300 is retightened. The shaft 424 may be torqued to move the torqueing socket 434 into the tightening member 320 via the hinge 437 when the retightenable wedge assembly 300 needs to be retightened. The shaft 424 may be driven by a motor.

The wedge tool assembly 420 may include at least a light source 435 and a camera 436 that are attached to the plate 430. The camera 436 may be a digital camera. The camera 436 may provide digital signal of the retightenable wedge assembly 300.

FIG. 5 illustrates a schematic perspective view of a wedge tool assembly 420 according to an embodiment. As illustrated in FIG. 5, a pair of guiding skids 438 are axially attached to the plate 430. The guiding skids 438 are spaced apart from each other. A distance between the guiding skids 438 may correspond to a width of a slot 120. The guiding skids 438 guides the tool system 400 axially moving along the slot 120. A radial position of the plate 430 is adjustable by the screws 428 that adjusts a radial position of the guiding skids 438 attached to the plate 430. The radial position of the plate 430 is adjusted by the screws 428 such that the guiding skids 438 attach to a top surface of the slot wedge 310 of the retightenable wedge assembly 300.

In power plant operation, tightness inspection of wedges may be periodically performed, such as during maintenance or at power plant outages. Conventionally a full or partial re-wedging may be required if the wedges are loosen. A conventionally re-wedging process may require repetitively axially driving the wedges. The process may also require removal of rotor. The process may need exhausting effort and time and material. According to an aspect, the proposed tool system 400 may easily radially tighten a retightenable wedge system 200 from top of a slot wedge 310, thus eliminate the conventionally exhausting repetitive effort for axially driving wedges over slot 120.

According to an aspect, the proposed tool system 400 may allow to tighten the wedge system 400 with ease at first installation and during either a maintenance or outage of a generator. The proposed tool system 400 may tighten the coil 140 in a single step. The proposed tool system 400 may not require removing rotor for tightening the coil 140 in the slot 120. The proposed tool system 400 may be adapted or modified according to different designs of a retightenable wedge system 200 for use on different generators.

According to an aspect, the proposed tool system 400 may be a robotic tool system that is automatically driven by motorized drives 411. The proposed tool system 400 may automatically tighten the retightenable wedge system 200 by a torqueing socket 434 driven by a motorized warm gear arrangement. The proposed tool system 400 provides a simple and efficient way for tightening the retightenable wedge system 200 in the slot 120. The proposed tool system 400 significantly reduces man power and provides cost savings for generator installation and maintenance.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator Stator
110: Stator Core
120: Slot
130: Side Wall of Slot
140: Coil
150: Wedge Groove
200: Retightenable Wedge System
210: First Filler Layer
220: Spring Member
230: Second Filler Layer
300: Retightenable Wedge Assembly
310: Slot Wedge
320: Tightening Member
330: Locking Member
400: Tool System
410: Tool Carriage Assembly
411: Motorized Drive
412: Digital Encoder
413: Arm
414: Cable
420: Wedge Tool Assembly
421: Housing of the Wedge Tool Assembly
422: Top Surface of the Housing
423: Bottom Surface of the Housing
424: Shaft
425: Light Source attached to the Housing
426: Camera attached to the Housing
427: Hinge Assembly
428: Screw
429: Aperture of the Housing
430: Plate
431: Worm Shaft of Worm Gear Arrangement
432: Worm Wheel of Worm Gear Arrangement
433: Motor
434: Torqueing Socket
435: Light Source attached to the Plate
436: Camera attached to the Plate
437: Hinge
438: Guiding Skid

What is claimed is:

1. A tool system for tightening a retightenable wedge system in a slot of a generator stator core, wherein the retightenable wedge system comprises a first filler layer placed on a coil in the slot, a spring member placed on the first filler layer, a second filler layer placed on the spring member, and a retightenable wedge assembly comprising a tightening member and a slot wedge placed on the second filler layer, the tool system comprising:
    a tool carriage assembly configured for axially moving the tool system along the slot, which is parallel to a central axis of the generator stator core, and to hold the tool system on the slot at an axial position of the generator stator core; and
    a wedge tool assembly pivotally coupled to the tool carriage assembly configured to tighten the retightenable wedge assembly,
    wherein the wedge tool assembly comprises a housing and a torqueing socket arranged on the housing, and
    wherein the torqueing socket is configured to be inserted into the tightening member to radially tighten the retightenable wedge assembly, radially with respect to the generator stator core central axis.

2. The tool system as claimed in claim 1, wherein the wedge tool assembly comprises a plate attached to a bottom surface of the housing by a plurality of screws.

3. The tool system as claimed in claim 2, wherein the wedge tool assembly comprises a worm gear arrangement arranged on the plate.

4. The tool system as claimed in claim 3, wherein the torqueing socket is configured to be driven by the worm gear arrangement to tighten the retightenable wedge assembly.

5. The tool system as claimed in claim 3, wherein the wedge tool assembly comprises a motor that is configured to drive the worm gear arrangement.

6. The tool system as claimed in claim 2, wherein the wedge tool assembly comprises a pair of guiding skids attached to the plate and spaced apart from each other, wherein the guiding skids is configured to guide the tool system along the slot, and wherein a position of the plate is adjustable, as a result of repositioning the screws such that the guiding skids attach to a top surface of the slot wedge.

7. The tool system as claimed in claim 1, wherein the wedge tool assembly comprises a shaft arranged on a top surface of the housing, and wherein the shaft is connected to the torqueing socket such that the shaft is configured to move the torqueing socket in a rotational direction of the socket and radial direction of the generator stator core.

8. The tool system as claimed in claim 7, wherein the top surface of the housing has a concave shape, and wherein the shaft is embedded in the concave shaped top surface.

9. The tool system as claimed in claim 7, wherein the shaft is connected to the torqueing socket via a hinge through an aperture penetrating the housing from a bottom surface of the housing to the top surface.

10. The tool system as claimed in claim 1, wherein the housing comprises a hinge assembly that is configured to pivotally couple the wedge tool assembly to the tool carriage assembly.

11. A method for tightening the retightenable wedge system in the slot of the generator stator core using the tool system according to claim 1, wherein the retightenable wedge system comprises the first filler layer placed on the coil in the slot, the spring member placed on the first filler layer, the second filler layer placed on the spring member, and the retightenable wedge assembly comprising the tightening member and the slot wedge placed on the second filler layer, wherein the tool system comprises the tool carriage assembly and the wedge tool assembly pivotally coupled to the tool carriage assembly, the method comprising:
- axially moving the tool system along the slot by the tool carriage assembly;
- holding the tool system on the slot at an axial position by the tool carriage assembly; and
- tightening the retightenable wedge assembly by the wedge tool assembly,
- wherein the wedge tool assembly comprises a housing and a torqueing socket arranged on the housing, and
- wherein the torqueing socket is configured to be inserted into the tightening member to tighten the retightenable wedge assembly.

12. The method as claimed in claim 11, wherein the wedge tool assembly comprises a plate attached to a bottom surface of the housing by a plurality of screws.

13. The method as claimed in claim 12, wherein the wedge tool assembly comprises a worm gear arrangement arranged on the plate.

14. The method as claimed in claim 13, wherein the torqueing socket is configured to be driven by the worm gear arrangement to tighten the retightenable wedge assembly.

15. The method as claimed in claim 13, wherein the wedge tool assembly comprises a motor that is configured to drive the worm gear arrangement.

16. The method as claimed in claim 12, wherein the wedge tool assembly comprises a pair of guiding skids axially attached to the plate and spaced apart from each other, wherein the guiding skids is configured to guide the tool system axially moving along the slot, and wherein a radial position of the plate is adjustable by the screws such that the guiding skids attach to a top surface of the slot wedge.

17. The method as claimed in claim 11, wherein the wedge tool assembly comprises a shaft arranged on a top surface of the housing, and wherein the shaft is connected to the torqueing socket and is configured to move the torqueing socket in a radial direction.

18. The method as claimed in claim 17, wherein the top surface of the housing has a concave shape, and wherein the shaft is embedded in the concave shaped top surface.

19. The method as claimed in claim 17, wherein the shaft is connected to the torqueing socket via a hinge through an aperture penetrating the housing from a bottom surface to the top surface.

20. The method as claimed in claim 11, wherein the housing comprises a hinge assembly that is configured to pivotally couple the wedge tool assembly to the tool carriage assembly.

\* \* \* \* \*